United States Patent
Tang et al.

(10) Patent No.: US 9,681,447 B2
(45) Date of Patent: Jun. 13, 2017

(54) DYNAMIC LOCAL OSCILLATOR (LO) SCHEME AND SWITCHABLE RECEIVE (RX) CHAIN FOR CARRIER AGGREGATION

(71) Applicant: QUALCOMM Incorporated, San Diego, CA (US)

(72) Inventors: Yiwu Tang, San Diego, CA (US); Rajagopalan Rangarajan, San Diego, CA (US); Chiewcharn Narathong, Laguna Niguel, CA (US); Lai Kan Leung, San Marcos, CA (US); Aleksandar Miodrag Tasic, San Diego, CA (US); Dongling Pan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/636,591

(22) Filed: Mar. 3, 2015

(65) Prior Publication Data
US 2015/0334710 A1 Nov. 19, 2015

Related U.S. Application Data

(60) Provisional application No. 61/993,334, filed on May 15, 2014.

(51) Int. Cl.
| | |
|---|---|
| *H04L 1/00* | (2006.01) |
| *H04W 72/04* | (2009.01) |
| *H04L 5/00* | (2006.01) |
| *H04B 1/16* | (2006.01) |
| *H04L 27/26* | (2006.01) |
| *H04B 1/38* | (2015.01) |

(52) U.S. Cl.
CPC .......... *H04W 72/0453* (2013.01); *H04B 1/16* (2013.01); *H04L 5/001* (2013.01);
(Continued)

(58) Field of Classification Search
CPC .. H04B 10/293; H04B 10/294; H04B 10/296; H04B 10/564; H04B 7/2121;
(Continued)

(56) References Cited

U.S. PATENT DOCUMENTS

| 5,805,988 A | 9/1998 | Clayton et al. |
| 2010/0210272 A1* | 8/2010 | Sundstrom ........... H04B 1/0082 455/450 |

(Continued)

FOREIGN PATENT DOCUMENTS

WO   WO-2015047951   4/2015

OTHER PUBLICATIONS

International Search Report and Written Opinion—PCT/US2015/025962—ISA/EPO—Jul. 2, 2015.
(Continued)

*Primary Examiner* — Dady Chery
(74) *Attorney, Agent, or Firm* — Patterson & Sheridan, L.L.P.

(57) ABSTRACT

Certain aspects of the present disclosure provide methods and apparatus for dynamically adjusting a voltage-controlled oscillator (VCO) frequency, a local oscillator (LO) divider ratio, and/or a receive path when adding or discontinuing reception of a component carrier (CC) in a carrier aggregation (CA) scheme. This dynamic adjustment is utilized to avoid (or at least reduce) VCO, LO, and transmit signal coupling issues with multiple component carriers, with minimal (or at least reduced) current consumption by the VCO and the LO divider.

28 Claims, 12 Drawing Sheets

(52) U.S. Cl.
CPC .......... *H04L 5/003* (2013.01); *H04L 27/2647* (2013.01); *H04B 1/38* (2013.01)

(58) Field of Classification Search
CPC . H04B 7/2123; H04B 7/2615; H04J 14/0221; H04J 2203/0069; H04J 4/00; H04W 52/46; H04W 72/04; H04W 72/12; H04W 76/00; H04Q 2213/394; H04L 5/26
USPC ......... 455/90.2, 118.1, 189.1, 318, 323, 450, 455/550.1, 260, 78; 370/318, 328, 329, 370/330, 331, 332, 333
See application file for complete search history.

(56) References Cited

U.S. PATENT DOCUMENTS

| | | |
|---|---|---|
| 2013/0188756 A1 | 7/2013 | Sundstroem et al. |
| 2014/0038532 A1 | 2/2014 | George et al. |
| 2014/0169418 A1 | 6/2014 | Tu et al. |
| 2014/0170999 A1 | 6/2014 | Aparin |
| 2014/0295775 A1 | 10/2014 | Rousu et al. |

OTHER PUBLICATIONS

Nokia Corporation: "Considerations on retuning for deactivated SCell and related implications," 3GPP Draft; R4-102976, 3rd Generation Partnership Project (3GPP), Mobile Competence Centre ; 650 Route Des Lucioles ; F-06921 Sophia-Antipolis Cedex ; France, vol. RAN WG4, no. Madrid, Spain; 20100823, Aug. 19, 2010 (Aug. 19, 2010), XP050454331.

Qualcomm Incorporated: "Considerations for Single-Chip Implementations of Carrier Aggregation," 3GPP Draft, R4-131235, 3rd Generation Partnership Project (3GPP), Mobile Competence Centre, vol. RAN WG4, Apr. 9, 2013 (Apr. 9, 2013), pp. 1-3, XP050701942, Sophia-Antipolis Cedex, France, Retrieved from the Internet: URL:http://www.3gpp.org/ftp/tsg_ran/WG4_Radio/TSGR4_66bis/Docs/ [retrieved on Apr. 9, 2013].

* cited by examiner

| Mid Bands (MB) | | | Low Bands (LB) | High Bands (HB) | | | | Ultra-High Bands (UHB) | | Carrier |
|---|---|---|---|---|---|---|---|---|---|---|
|  |  |  |  | 41 | 41 | 41 | 41 |  |  | Sprint, CMCC, Japan SBM |
|  |  |  |  | 40 | 40 | 40 | 40 |  |  | Optus (Australia), CMCC |
| 1 | 3 |  | 28 | 7 |  |  |  |  |  | Telstra, Korea SKT, Kore LGU+ |
| 3 |  |  | 20 | 7 | 7 |  |  |  |  | EU |
| 3 |  |  | 8 | 28 | 7 |  |  |  |  | Korea KT |
| 3 | 3 |  | 20 | 7 |  |  |  |  |  | EU |
| 2 |  |  | 5 | 17 | 30 |  |  |  |  | AT&T |
| 4 |  |  | 5 | 17 | 30 |  |  |  |  | AT&T |
| 2 | 4 |  | 5 | 30 |  |  |  |  |  | AT&T |
| 2 | 4 |  | 17 | 30 |  |  |  |  |  | AT&T |
| 2 | 4 |  | 29 | 30 |  |  |  |  |  | AT&T |
| 1 | 3 |  | 5 | 28 |  |  |  |  |  | Korea SKT |
| 1 |  |  | 5 | 28 | 7 |  |  |  |  | Korea LGU+ |
| 1 |  |  | 8 | 26 | 7 |  |  |  |  | Korea KT |
| 3 |  |  | 8 | 26 | 7 |  |  |  |  | Korea KT |
| 1 | 3 |  | 26 | 7 |  |  |  |  |  | Korea KT |
| 1 | 3 |  | 8 | 7 |  |  |  |  |  | Korea KT |
| 1 | 21 | 3 | 5 |  |  |  |  |  |  | Japan DCM |
| 1 | 21 | 3 | 28 |  |  |  |  |  |  | Japan DCM |
| 1 | 21 |  |  |  |  |  |  | 42 | 42 | Japan DCM |
| 1 | 11 |  | 26 | 28 |  |  |  |  |  | Japan KDDI |
| 1 | 3 |  | 8 | 28 |  |  |  |  |  | Japan SBM |
|  |  |  |  | 41 | 41 |  |  | 42 | 42 | Japan SBM |
| 1 | 3 |  | 20 | 7 |  |  |  |  |  | EU |
| 25 |  |  | 26 | 41 | 41 |  |  |  |  | Sprint |
| 2 | 4 | 4 | 12 |  |  |  |  |  |  | Regional NA - TMO |

500

|      | Bands   | L divider | M divider | H divider | UH divider |
|------|---------|-----------|-----------|-----------|------------|
| CA0  | H/UH    |           |           | 2         | 3          |
| CA1  | L/M/H   | 4,5,6     | 2         | 2         |            |
| CA2  | L/M/H/UH| 8,10,12   | 3,4       | 3,4       | 2          |
| CA3  | M/H     |           | 2,3       | 2         |            |
| TX   | L/M/H   | 4,6,8     | 2,3       | 2         |            |

| Bands | Synthesizer | Div ratio | VCO current (mA) | Div current (mA) |
|-------|-------------|-----------|------------------|------------------|
| LB    | CA1         | 4,5,6     | 12               | 8                |
|       | CA2         | 8,10,12   | 20               | 10               |
| MB    | CA1         | 2         | 12               | 9                |
|       | CA2         | 3,4       | 21               | 14               |
|       | CA3         | 2         | 14               | 11               |
|       | CA3         | 3         | 14               | 14               |
| HB    | CA0         | 2         | 16               | 14               |
|       | CA1         | 2         | 12               | 11               |
|       | CA2         | 3,4       | 22               | 17               |
|       | CA3         | 2         | 16               | 12               |
| UHB   | CA0         | 3         | 24               | 19               |
|       | CA2         | 2         | 16               | 15               |

FIG. 5B

| Pcell | Scell | Tcell | divPT | divPR | divSR | divTR | gpsdiv | VCOPT | VCOPR | VCOSR | VCOTR | violations |
|---|---|---|---|---|---|---|---|---|---|---|---|---|
| B1 | B3 | B7 | 3 | 4 | 2 | 2 | 2 | CA1 | CA2 | CA1 | CA3 | 1 |
| B1 | B3 | B28 | 3 | 3 | 2 | 6 | 2 | CA1 | CA2 | CA3 | CA1 | 0 |
| B1 | B28 | B7 | 3 | 4 | 4 | 2 | 2 | CA1 | CA2 | CA1 | CA3 | 1 |
| B3 | B3 | B7 | 2 | 2 | 3 | 4 | 2 | CA1 | CA1 | CA3 | CA2 | 3 |
| B3 | B7 | B1 | 3 | 2 | 4 | 3 | 2 | CA1 | CA1 | CA2 | CA3 | 3 |
| B3 | B7 | B7 | 2 | 2 | 2 | 4 | 2 | CA1 | CA1 | CA3 | CA2 | 4 |
| B3 | B28 | B1 | 3 | 2 | 12 | 2 | 2 | CA1 | CA3 | CA2 | CA3 | 2 |
| B3 | B28 | B7 | 3 | 2 | 6 | 4 | 2 | CA1 | CA1 | CA1 | CA2 | 1 |
| B7 | B1 | B3 | 2 | 2 | 3 | 2 | 2 | CA1 | CA1 | CA2 | CA3 | 3 |
| B7 | B1 | B28 | 2 | 2 | 2 | 8 | 2 | CA1 | CA2 | CA3 | CA2 | 0 |
| B7 | B3 | B3 | 2 | 4 | 2 | 2 | 2 | CA1 | CA2 | CA1 | CA3 | 7 |
| B7 | B3 | B28 | 2 | 4 | 2 | 6 | 2 | CA1 | CA2 | CA3 | CA1 | 2 |
| B7 | B7 | B3 | 2 | 2 | 4 | 2 | 2 | CA1 | CA2 | CA2 | CA3 | 4 |
| B28 | B1 | B3 | 6 | 12 | 3 | 2 | 2 | CA1 | CA2 | CA3 | CA1 | 1 |
| B28 | B7 | B1 | 6 | 12 | 2 | 3 | 2 | CA1 | CA2 | CA1 | CA3 | 0 |
| B28 | B7 | B3 | 4 | 4 | 2 | 4 | 2 | CA1 | CA1 | CA3 | CA2 | 1 |

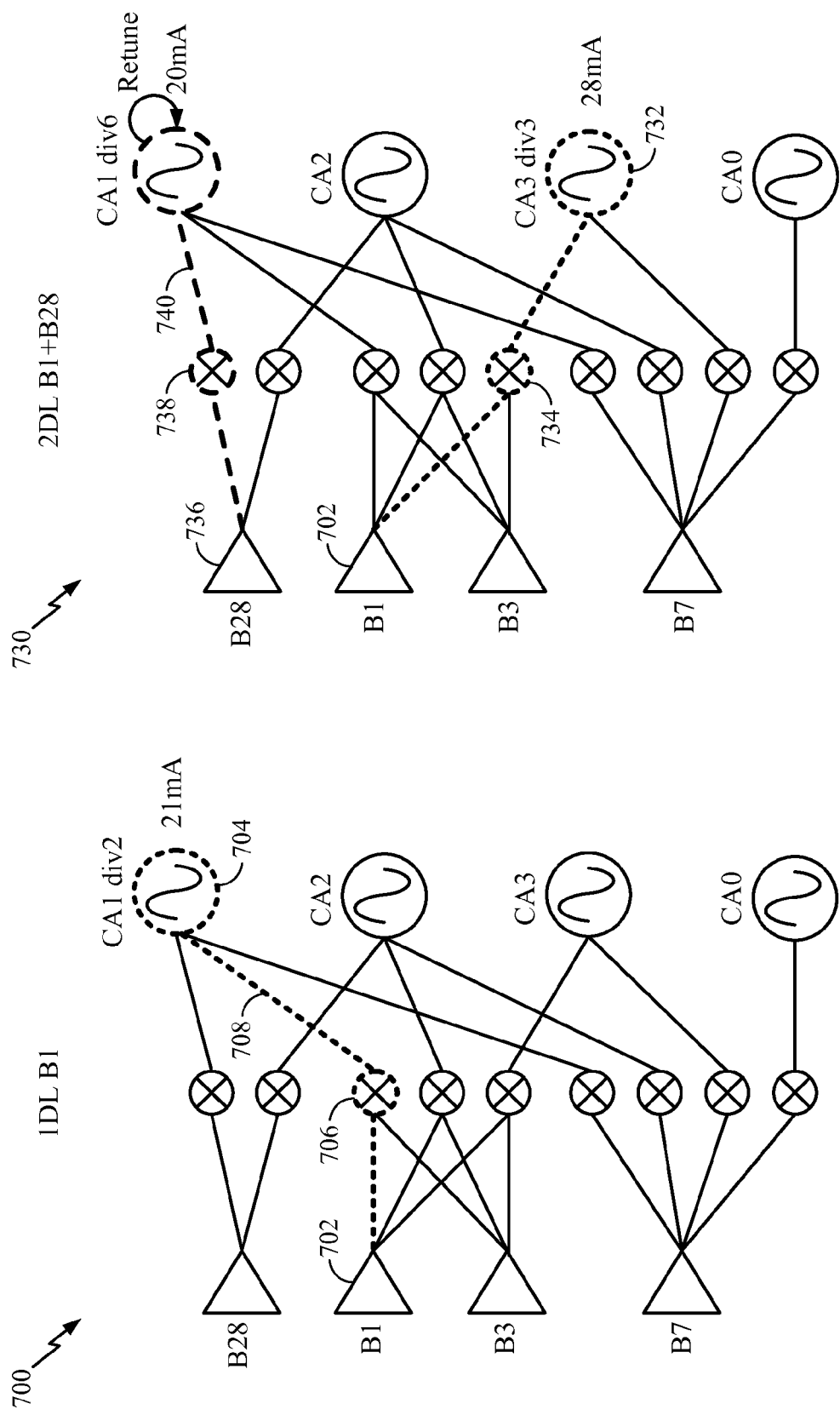

| (MHz) | 1DL | 2DL | 3DL | 4DL |
|---|---|---|---|---|
| B1 | 6330 | 6330 | 6330 | 6330 |
| B28 |  | 4548 | 4548 | 4548 |
| B7 |  |  | 5240 | 5240 |
| B3 |  |  |  | 3610 |

DYNAMIC LOCAL OSCILLATOR (LO) SCHEME AND SWITCHABLE RECEIVE (RX) CHAIN FOR CARRIER AGGREGATION

CROSS-REFERENCE TO RELATED APPLICATION

This application claims the benefit of U.S. Provisional Patent Application Ser. No. 61/993,334, entitled "DYNAMIC LOCAL OSCILLATOR (LO) SCHEME AND SWITCHABLE RECEIVE (RX) CHAIN FOR CARRIER AGGREGATION" and filed May 15, 2014, which is herein incorporated by reference in its entirety.

TECHNICAL FIELD

Certain aspects of the present disclosure generally relate to radio frequency (RF) circuits for wireless communications and, more particularly, to a dynamic local oscillator (LO) scheme and reconfigurable receive paths for carrier aggregation (CA).

BACKGROUND

Wireless communication networks are widely deployed to provide various communication services such as telephony, video, data, messaging, broadcasts, and so on. Such networks, which are usually multiple access networks, support communications for multiple users by sharing the available network resources. For example, one network may be a 3G (the third generation of mobile phone standards and technology) system, which may provide network service via any one of various 3G radio access technologies (RATs) including EVDO (Evolution-Data Optimized), 1×RTT (1 times Radio Transmission Technology, or simply 1×), W-CDMA (Wideband Code Division Multiple Access), UMTS-TDD (Universal Mobile Telecommunications System-Time Division Duplexing), HSPA (High Speed Packet Access), GPRS (General Packet Radio Service), or EDGE (Enhanced Data rates for Global Evolution). The 3G network is a wide area cellular telephone network that evolved to incorporate high-speed internet access and video telephony, in addition to voice calls. Furthermore, a 3G network may be more established and provide larger coverage areas than other network systems. Such multiple access networks may also include code division multiple access (CDMA) systems, time division multiple access (TDMA) systems, frequency division multiple access (FDMA) systems, orthogonal frequency division multiple access (OFDMA) systems, single-carrier FDMA (SC-FDMA) networks, $3^{rd}$ Generation Partnership Project (3GPP) Long Term Evolution (LTE) networks, and Long Term Evolution Advanced (LTE-A) networks.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station.

SUMMARY

Certain aspects of the present disclosure generally relate to a dynamic local oscillator (LO) scheme and reconfigurable receive paths for carrier aggregation (CA). This provides for minimal current consumption while maintaining receiver (Rx) de-sense performance (i.e., avoiding voltage-controlled oscillator (VCO), LO, and transmitter signal coupling).

Certain aspects of the present disclosure provide a method for wireless communications. The method generally includes receiving and processing a first component carrier (CC) in a carrier aggregation scheme via a first receive path comprising a first low noise amplifier (LNA) and a first mixer, wherein the first LNA is configured to amplify the first CC and wherein the first mixer is configured to multiply the amplified first CC with a first LO signal received via a first LO path and generated by a first frequency synthesizer whose output frequency is divided down by a first divide ratio to create the first LO signal; adding or discontinuing reception of a second CC in the carrier aggregation scheme, the second CC having a different frequency than the first CC; and based on the added or discontinued reception of the second CC, at least one of: (1) retuning the first frequency synthesizer to a different output frequency; (2) changing the first divide ratio; or (3) switching the amplified first CC from being multiplied by the first mixer to being multiplied by a second mixer with the first LO signal received via a second LO path and generated by a second frequency synthesizer whose output frequency is divided down by a second divide ratio to create the first LO signal.

Certain aspects of the present disclosure provide an apparatus for wireless communications. The apparatus generally includes a first frequency synthesizer whose output frequency is divided down by a first divide ratio to create a first LO signal; a first receive path configured to receive and process a first component carrier (CC) in a carrier aggregation scheme, the first receive path comprising: a first low noise amplifier (LNA) configured to amplify the first CC; and a first mixer configured to multiply the amplified first CC with the first LO signal received via a first LO path; and a processing system. The processing system is typically configured to add or discontinue reception of a second CC in the carrier aggregation scheme, the second CC having a different frequency than the first CC; and based on the added or discontinued reception of the second CC, to at least one of: retune the first frequency synthesizer to a different output frequency; change the first divide ratio; or switch the amplified first CC from being multiplied by the first mixer to being multiplied by a second mixer with the first LO signal received via a second LO path and generated by a second frequency synthesizer whose output frequency is divided down by a second divide ratio to create the first LO signal.

Certain aspects of the present disclosure provide a non-transitory computer-readable medium for wireless communications. The medium generally includes instructions stored thereon, which are executable to receive and process a first CC in a carrier aggregation scheme via a first receive path comprising a first LNA and a first mixer, wherein the first LNA is configured to amplify the first CC and wherein the first mixer is configured to multiply the amplified first CC with a first LO signal received via a first LO path and generated by a first frequency synthesizer whose output frequency is divided down by a first divide ratio to create the first LO signal; to add or discontinue reception of a second CC in the carrier aggregation scheme, the second CC having a different frequency than the first CC; and based on the added or discontinued reception of the second CC, to at least one of: retune the first frequency synthesizer to a different output frequency; change the first divide ratio; or switch the amplified first CC from being multiplied by the first mixer to being multiplied by a second mixer with the first LO signal received via a second LO path and generated by a second frequency synthesizer whose output frequency is divided down by a second divide ratio to create the first LO signal.

Certain aspects of the present disclosure provide an apparatus for wireless communications. The apparatus generally includes means for synthesizing a first frequency; means for frequency dividing the first frequency by a first divide ratio to create a first LO signal; means for receiving and processing a first CC in a carrier aggregation scheme, comprising: means for amplifying the first CC and first means for mixing the amplified first CC with the first LO signal received via a first LO path; means for adding or discontinuing reception of a second CC in the carrier aggregation scheme, the second CC having a different frequency than the first CC; and means for selecting, based on the added or discontinued reception of the second CC, between at least one of: retuning the means for synthesizing the first frequency to a different output frequency; changing the first divide ratio; or switching the amplified first CC from being mixed by the first means for mixing to being mixed by a second means for mixing with the first LO signal received via a second LO path and generated by means for synthesizing a second frequency that is divided down by a second divide ratio to create the first LO signal.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5A is a table of example local oscillator (LO) divide ratios for different CA frequency synthesizers, in accordance with certain aspects of the present disclosure.

FIG. 5B is a reorganized version of the table in FIG. 5A, adding example voltage-controlled oscillator (VCO) and LO divider current consumption, in accordance with certain aspects of the present disclosure.

FIG. 6 is a table providing a number of coupling violations for various example CA frequency band combinations of B1, B3, B7 and B28, in accordance with certain aspects of the present disclosure.

FIGS. 7A-7D illustrate a dynamic LO scheme and receive path configuration, when sequentially adding downlink component carriers (CCs), in accordance with certain aspects of the present disclosure.

DETAILED DESCRIPTION

Various aspects of the present disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11, IEEE 802.16, Long Term Evolution (LTE) (e.g., in TDD and/or FDD modes), or some other standards. A TDMA system may implement Global System for Mobile Communications (GSM) or some other standards. These various standards are known in the art.

An Example Wireless System

Figure 1:
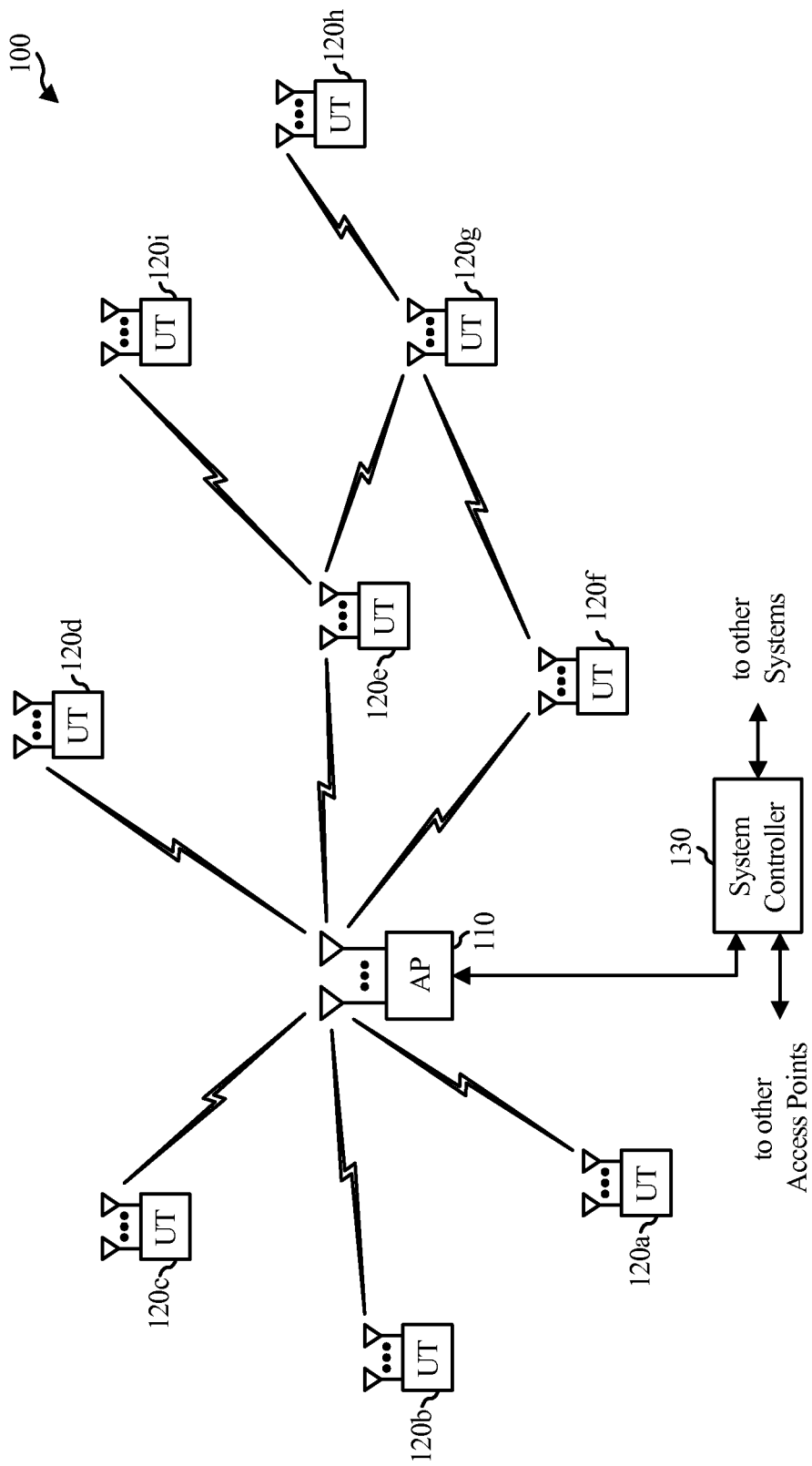
FIG. 1 is a diagram of an example wireless communications network in accordance with certain aspects of the present disclosure.

FIG. 1 illustrates a wireless communications system 100 with access points 110 and user terminals 120. For simplicity, only one access point 110 is shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless system 100 may be a time division duplex (TDD) system or a frequency division duplex (FDD) system. For a TDD system, the downlink and uplink share the same frequency band. For an FDD system, the downlink and uplink use different frequency bands. System 100 may also utilize a single carrier or multiple carriers for transmission. Each user terminal may be equipped with a single antenna (e.g., in order to keep costs down) or multiple antennas (e.g., where the additional cost can be supported).

Figure 2:
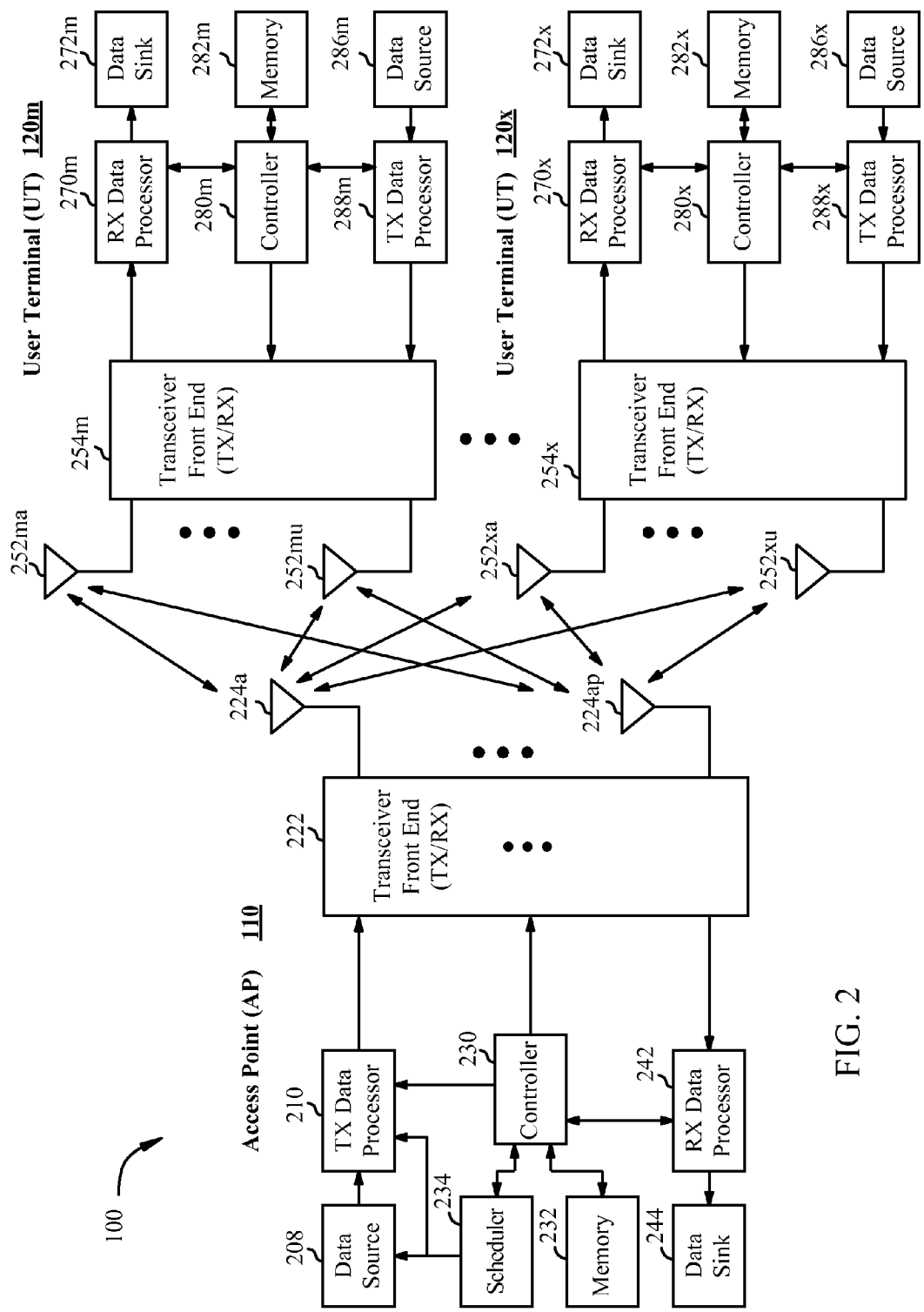
FIG. 2 is a block diagram of an example access point (AP) and example user terminals in accordance with certain aspects of the present disclosure.

FIG. 2 shows a block diagram of access point 110 and two user terminals 120m and 120x in wireless system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. For certain aspects of the present disclosure, a combination of the signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each user terminal 120, $N_{ut,m}$ antennas 252 receive the downlink signals from access point 110. For receive diversity at the user terminal 120, the transceiver front end 254 may select signals received from one of the antennas 252 for processing. For certain aspects of the present disclosure, a combination of the signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes)

the recovered downlink data symbol stream to obtain decoded data for the user terminal.

Those skilled in the art will recognize the techniques described herein may be generally applied in systems utilizing any type of multiple access schemes, such as TDMA, SDMA, Orthogonal Frequency Division Multiple Access (OFDMA), CDMA, SC-FDMA, TD-SCDMA, and combinations thereof.

Figure 3:
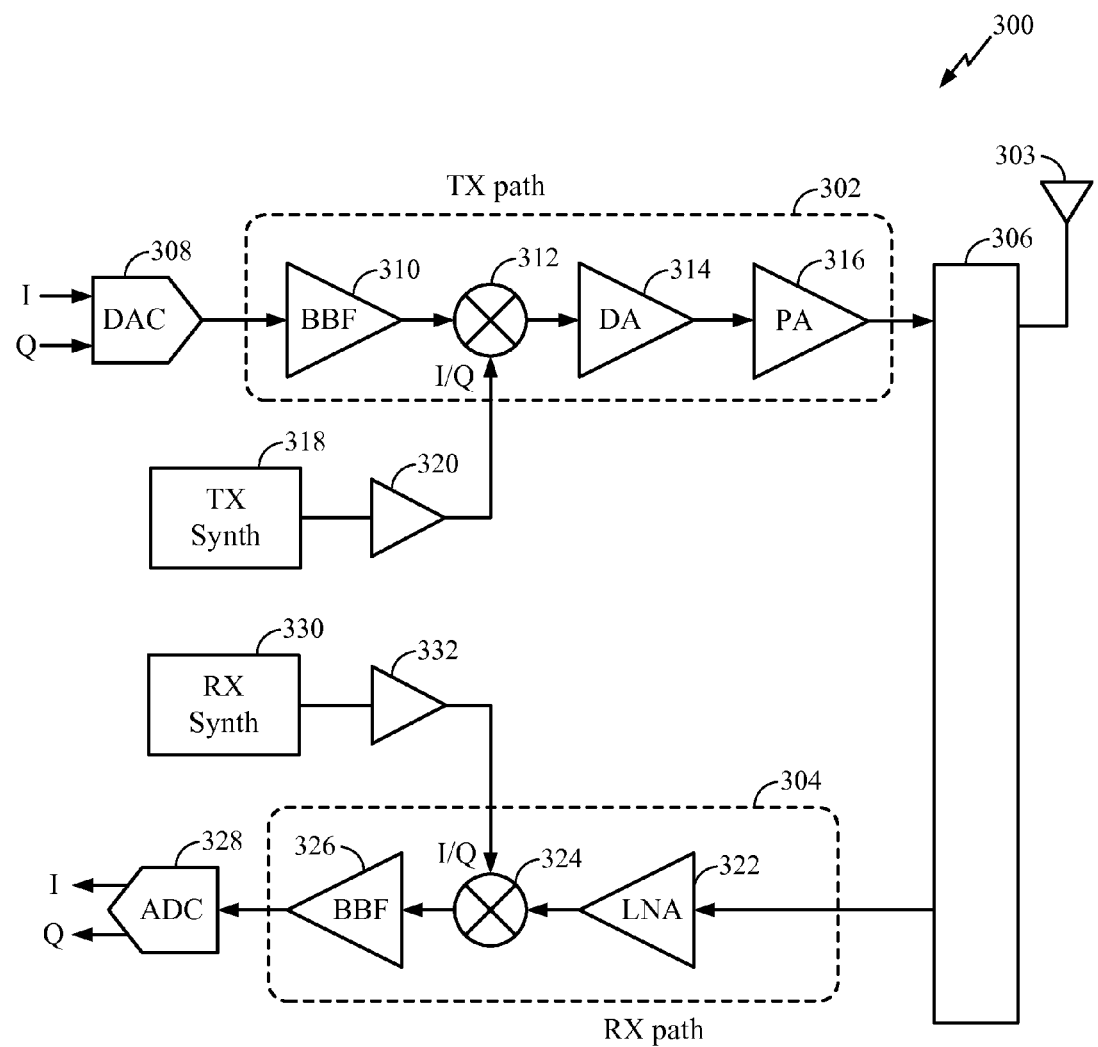
FIG. 3 is a block diagram of an example transceiver front end in accordance with certain aspects of the present disclosure.

FIG. 3 is a block diagram of an example transceiver front end 300, such as transceiver front ends 222, 254 in FIG. 2, in accordance with certain aspects of the present disclosure. The transceiver front end 300 includes a transmit (TX) path 302 (also known as a transmit chain) for transmitting signals via one or more antennas and a receive (RX) path 304 (also known as a receive chain) for receiving signals via the antennas. If the TX path 302 and the RX path 304 share an antenna 303, the paths may be connected with the antenna via an interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier 316. The BBF 310, the mixer 312, and the DA 314 may be included in a radio frequency integrated circuit (RFIC), while the PA 316 is often external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which are amplified by the DA 314 and by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies indicates using a variable-frequency oscillator, which involves compromises between stability and tunability. Contemporary systems employ frequency synthesizers with a voltage-controlled oscillator (VCO) to generate a stable, tunable LO with a particular tuning range. Thus, the transmit LO is typically produced by a TX frequency synthesizer 318, which may be buffered or amplified by amplifier 320 (and/or frequency divided) before being mixed with the baseband signals in the mixer 312. Similarly, the receive LO is typically produced by an RX frequency synthesizer 330, which may be buffered or amplified by amplifier 332 (and/or frequency divided) before being mixed with the RF signals in the mixer 324.

Example Dynamic LO Scheme and Switchable RX Chain in Carrier Aggregation

Carrier aggregation is used in some radio access technologies (RATs), such as LTE-A, in an effort to increase the bandwidth, and thereby increase bitrates. In carrier aggregation, multiple frequency resources (i.e., carriers) are allocated for sending data. Each aggregated carrier is referred to as a component carrier (CC). In LTE Rel-10, for example, up to five component carriers can be aggregated, leading to a maximum aggregated bandwidth of 100 MHz. The allocation of resources may be contiguous or non-contiguous. Non-contiguous allocation may be either intra-band (i.e., the component carriers belong to the same operating frequency band, but have one or more gaps in between) or inter-band, in which case the component carriers belong to different operating frequency bands.

In LTE-A carrier aggregation (CA), multiple carriers are used in a mobile transceiver to increase data throughput. Each carrier utilizes a voltage-controlled oscillator (VCO) to generate its local oscillator (LO) frequency. To minimize, or at least reduce, coupling of the VCOs among themselves and between VCOs and transmitter (TX) signals, a comprehensive VCO frequency plan and LO divide ratio scheme may be used. This allows the same LO frequency to be generated in different ways, such that for certain CA frequency band combinations, one or a few VCO/LO combinations will yield the minimum coupling and Rx de-sense. Contemporary solutions include: (1) pre-assigning VCO frequency plan and LO divide ratio to the given CA combination; and (2) using digital coupling cancellation, such as non-linear interference cancellation (NLIC). Both solutions have a current penalty (i.e., unnecessarily consume more current) compared with certain aspects of the present disclosure.

Instead of the static LO scheme, certain aspects of the present disclosure provide dynamic LO generation. The lowest current consumption for one downlink component carrier (1DL) is the starting point if there is no CA coupling (e.g., use CA frequency synthesizer CA1). Then, if more downlink component carrier options are available, the minimum current solution is chosen for 2DL or 3DL, for example. The dynamic LO scheme will converge to the same current consumption as the static scheme when the maximum number of downlink component carriers is reached. From 1DL to the maximum number of downlink component carriers, the VCO may be retuned for a new configuration, the LO divide ratio may be changed, and/or the receive path may be switched to a different mixer with a different LO drive (e.g., a different LNA), all in an effort to achieve minimum coupling while consuming the lowest current.

Figure 4:
FIG. 4 is a table of example frequency band combinations for downlink carrier aggregation (CA) in different regions, in accordance with certain aspects of the present disclosure.

Each carrier has different CA frequency band combinations in different regions. The table 400 in FIG. 4 provides some examples for 4 downlink component carrier (4DL) carrier aggregation. The frequency band combination B1/B3/B7/B28 (the third row in the table 400) is used for illustrative purposes in the present disclosure, but the ideas presented herein apply to any frequency band combination.

To avoid VCO and LO coupling, a comprehensive scheme involving a VCO frequency plan, a particular LO divide ratio, and a certain receive chain configuration may be utilized. This allows the LO frequency of the same band to be generated in different ways. For example, over 90 different VCO/LO coupling mechanisms may be analyzed for each band combination with different frequency and LO divide ratios. If one of the following equations is satisfied, there is a coupling violation:

$$f\_VCO \begin{Bmatrix} PRx \\ SRx \\ TRx \\ Tx \\ GPS \end{Bmatrix} \pm \begin{Bmatrix} 1 \\ 2 \end{Bmatrix} f\_Tx = f\_sig \begin{Bmatrix} PRx \\ SRx \\ TRx \\ GPS \end{Bmatrix}$$

$$f\_VCO \begin{Bmatrix} PRx \\ SRx \\ TRx \\ Tx \\ GPS \end{Bmatrix} \pm f\_VCO \begin{Bmatrix} PRx \\ SRx \\ TRx \\ Tx \\ GPS \end{Bmatrix} \pm f\_Tx = f\_sig \begin{Bmatrix} PRx \\ SRx \\ TRx \\ GPS \end{Bmatrix}$$

$$f\_VCO \begin{Bmatrix} PRx \\ SRx \\ TRx \\ Tx \\ GPS \end{Bmatrix} \pm \begin{Bmatrix} 1 \\ 2 \end{Bmatrix} f\_Tx = 0$$

where f_VCO is the VCO frequency, f_Tx is the transmitter frequency, f_sig is the receive signal frequency, PRx is the primary receiver (Rx), SRx is the secondary receiver, TRx is the tertiary receiver, Tx is the transmitter, and GPS is the Global Positioning System.

FIG. 5A is a table 500 of example LO divide ratios for four different CA frequency synthesizers (CA0-CA3) and the transmitter (TX), in accordance with certain aspects of the present disclosure. To achieve minimum coupling for a given 4DL CA combination, certain VCO frequency and LO divide ratios (e.g., div2, div3, and div6) are implicated. For example, for the combination B1+B3+B7+B28, B1 (CA2 div3)+B3 (CA3 div2)+B28 (CA1 div6)+B7 (CA0 div2) may be desired for zero coupling violations. B28 is a low frequency band (LB), B1 and B3 are mid frequency bands (MB), and B7 is a high frequency band (HB) according to the table 400.

Although the same LO frequency may be generated with different CA frequency synthesizers and divide ratios, the current consumption may be very different, as illustrated in table 550 of FIG. 5B. The table 550 is a reorganized version of the table 500 of FIG. 5A, with the addition of example VCO and LO divider current consumption values.

FIG. 6 is a table 600 providing a number of coupling violations for various example CA frequency band combinations of B1, B3, B7, and B28, in accordance with certain aspects of the present disclosure. In the table 600, "Pcell" is the primary cell band, where the transmitter (Tx) is in the Pcell, "Scell" is the secondary cell band, "Tcell" is the tertiary cell band, "PT" is the primary transmitter, "PR" is the primary Rx, "SR" is the secondary Rx, and "TR" is the tertiary Rx. Also in the table 600, "div_" is the LO divide ratio (e.g., ranging from 2 to 12), and "VCO_" is the CA frequency synthesizer.

If the assignment of B1 to CA2/div3, B3 to CA3/div2, B28 to CA1/div6, and B7 to CA0/div2 is fixed, this assignment should have the minimum coupling violation when all four downlink CCs are used in the second row of the table 600. However, for a one downlink (1DL) component carrier case (which is non-CA) in B1, B3, or B7, the current consumption is not optimal compared to the case where the CA1 frequency synthesizer is used for these bands (instead of B28). Similarly for a 2DL case, B1+B3 with CA2/div3+CA3/div2 consumes more current than CA1/div2+CA3/div2.

Note that the 4DL case may have any sequence of bring-up from 1DL to 4DL. As an example, B1→B1+B3→B1+B3+B28→B1+B3+B28+B7. As an alternative example, B3→B3+B7→B3+B7+B1→B3+B7+B1+B28.

Instead of the static LO scheme, certain aspects, of the present disclosure provide a dynamic LO generation. Certain aspects may typically start for 1DL with the lowest current solution if there is no CA coupling (e.g., CA1). Then as CCs are added, the minimum current solution for 2DL or 3DL may be chosen if more minimum coupling violation options are available. By design, this dynamic LO scheme will converge to the same current consumption as the static LO scheme when the number of downlink components carriers reaches the maximum number of DL CCs (max DL).

From 1DL to max DL, the VCO in the CA frequency synthesizer may be retuned for the new configuration, the LO divide ratio may be changed, and/or the receive path may be reconfigured, for example, by switching to a different mixer with a different LO drive (e.g., different LNA). In this manner, minimum coupling may be achieved while consuming the lowest, or at least reduced, current.

FIGS. 7A-7D illustrate a dynamic LO scheme and receive path configuration, when sequentially adding downlink component carriers (1DL→2DL→3DL→4DL), in accordance with certain aspects of the present disclosure. The sequence may occur in reverse with the same configurations when sequentially discontinuing reception of downlink CCs (4DL→3DL→2DL→1DL).

In the configuration 700 of FIG. 7A, the frequency synthesizer with the lowest current consumption (e.g., CA1 VCO 704) is used for 1DL, where coupling from other VCOs is not an issue. Here, a received component carrier in B1 is amplified by an LNA 702, and a mixer 706 multiplies the amplified B1 CC with an LO signal 708 provided by CA1 with an LO divide ratio of div2. With B1 being an MB, note that the CA1 div2 scheme has the lowest total current consumption of 21 mA, with the VCO current being 12 mA and the divider current being 9 mA as illustrated in the table 550 of FIG. 5B.

In the configuration 730 of FIG. 7B, a component carrier in B28 is added. Therefore, the CA3 VCO 732 is enabled, and the component carrier in B1 is now moved to CA3 with a divide ratio of div3 by switching to a different mixer 734 for B1. The component carrier in B28 is amplified by another LNA 736, and a mixer 738 multiplies the amplified B28 CC with an LO signal 740 provided by CA1 with a different LO divide ratio of div6. The CA1 VCO is also retuned to B28.

Figures 7C, 7D:
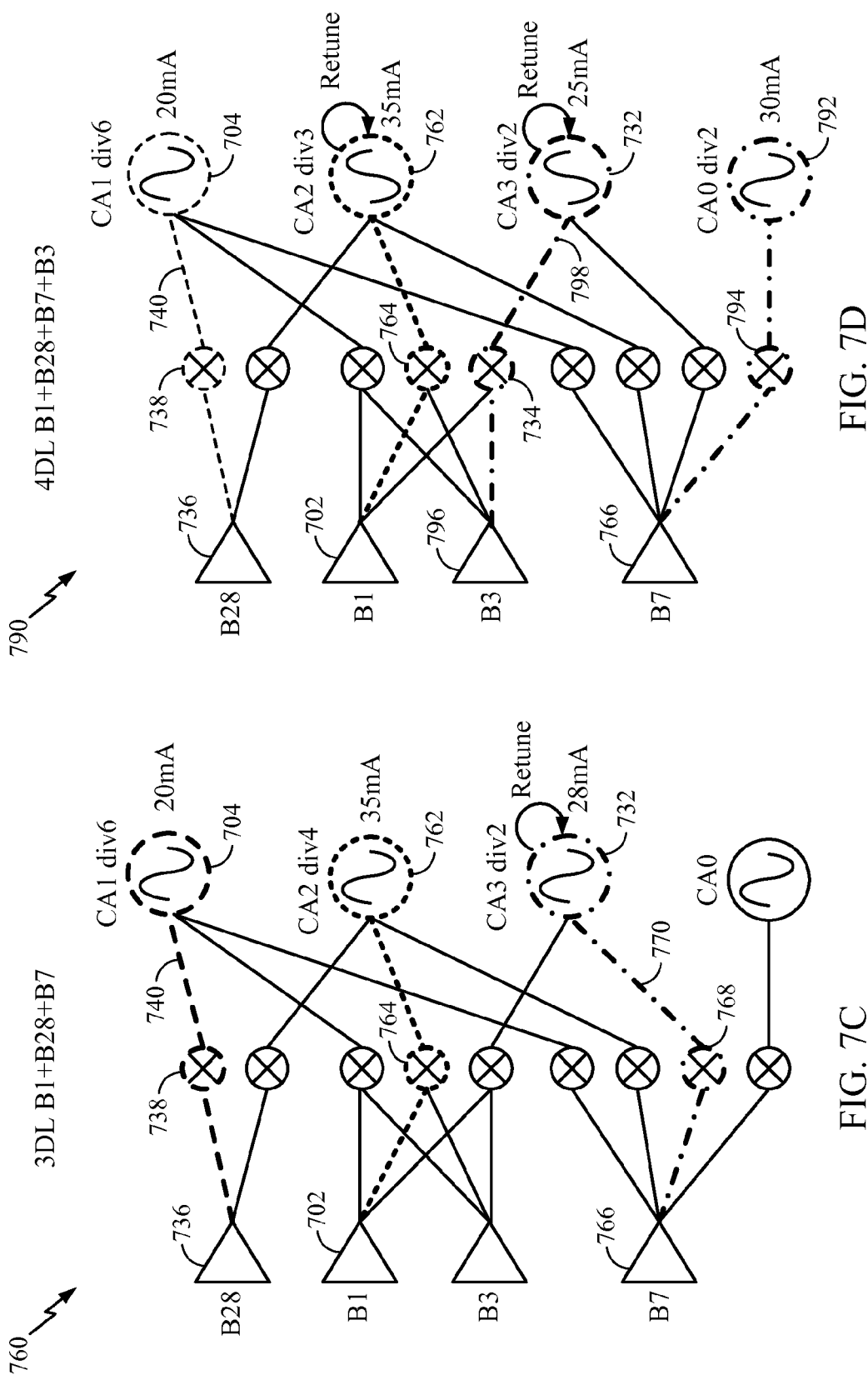

In the configuration 760 of FIG. 7C, a component carrier in B7 is added. Therefore, the CA2 VCO 762 is enabled, and the B1 CC is now moved to CA2 with a div4 divide ratio by switching to yet another mixer 764 for B1. The CA3 VCO 732 is retuned to B7, the B7 CC is amplified by yet another LNA 766, and a mixer 768 multiplies the amplified B7 CC with an LO signal 770 provided by CA3 with a different LO divide ratio of div2.

In the configuration 390 of FIG. 7D, a component carrier in B3 is added. Consequently, the CA0 VCO 792 is enabled, and the B7 CC is now moved to CA0 with a div2 divide ratio by switching to a different mixer 794 for B7. The B1 CC remains with CA2 but a different LO divide ratio of div3 is used. The CA3 VCO 732 is retuned to B3, the B3 CC is amplified by yet another LNA 796, and the mixer 734 multiplies the amplified B3 CC with an LO signal 798 provided by CA3 with a div2 divide ratio.

Figure 8:
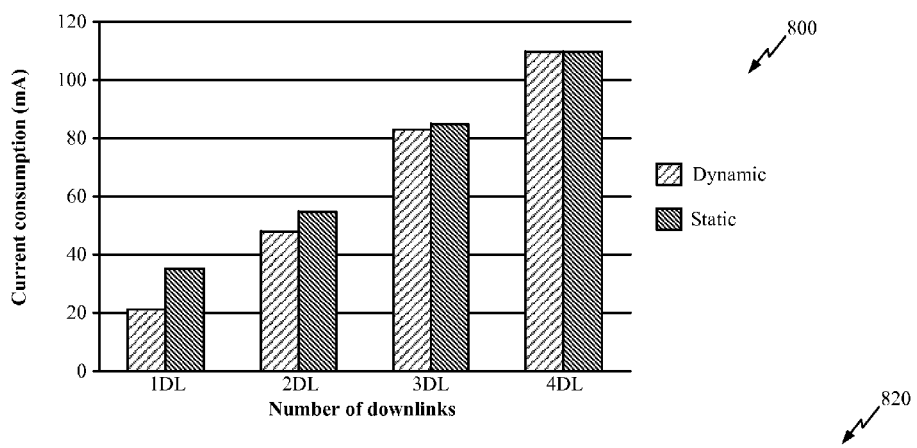
FIG. 8 is a bar graph comparing example current consumption between a dynamic LO scheme and a static LO scheme for different numbers of downlink CCs, in accordance with certain aspects of the present disclosure.

FIG. 8 is a bar graph 800 and a corresponding table 820 comparing example current consumption between a dynamic LO scheme and a static LO scheme for different numbers of downlink CCs, in accordance with certain aspects of the present disclosure. Note that the dynamic and static LO schemes have similar current consumption when using the maximum number of downlink component carriers (4DL in this case), but that the dynamic LO scheme has considerably lower current consumption in the cases with fewer downlink component carriers.

Figure 9A:
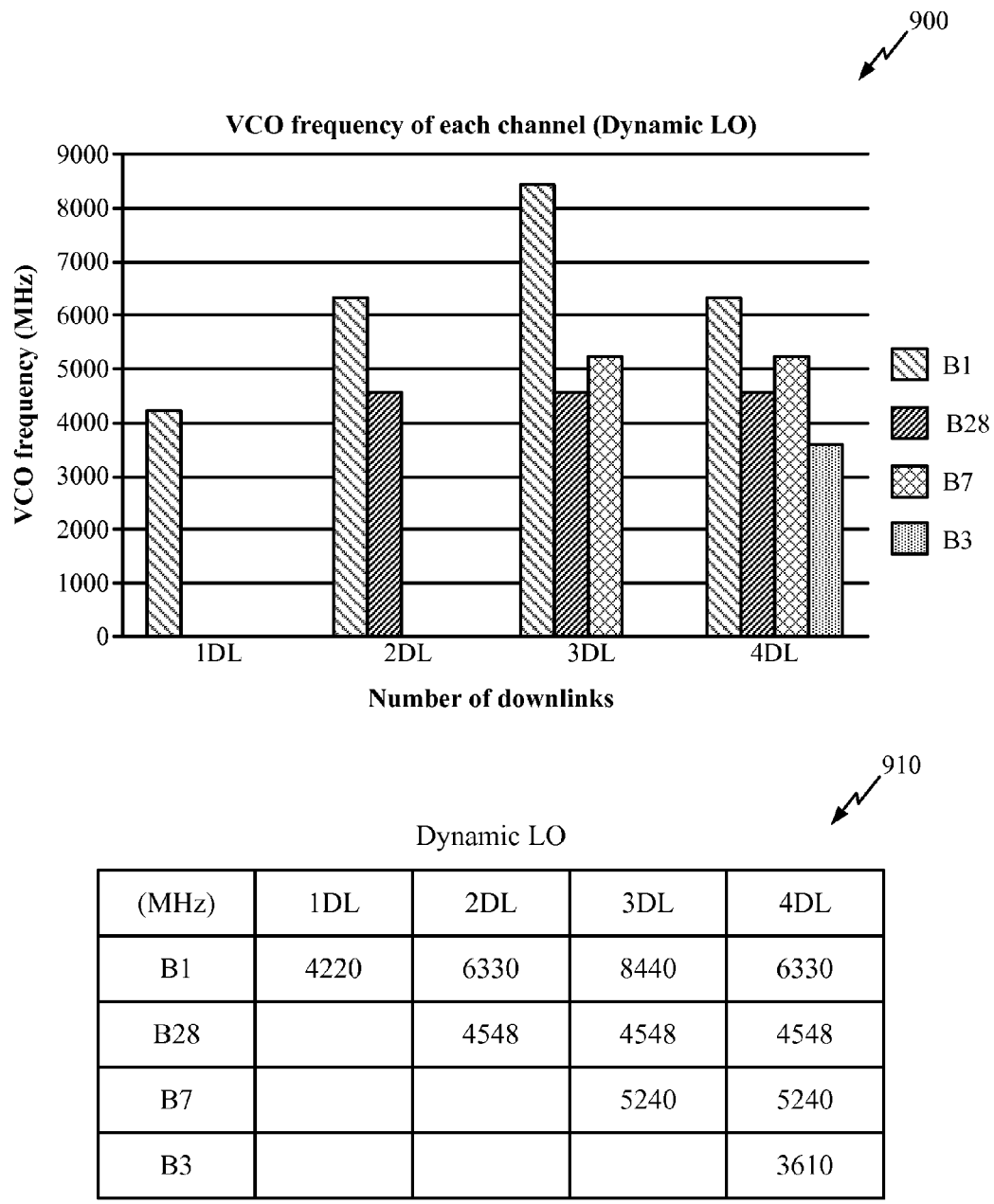
FIG. 9A provides a bar graph and a corresponding table of VCO frequencies for different numbers of downlink CCs for a dynamic LO scheme, in accordance with certain aspects of the present disclosure.

FIG. 9A provides a bar graph 900 and a corresponding table 910 of VCO frequencies for different numbers of downlink CCs for a dynamic LO scheme, in accordance with certain aspects of the present disclosure. For the dynamic LO scheme, more VCO spectra show up as more downlink component carriers are added. The VCO spectra of existing downlink CCs may change as carriers are added or removed, as illustrated here for B1.

Figure 9B:
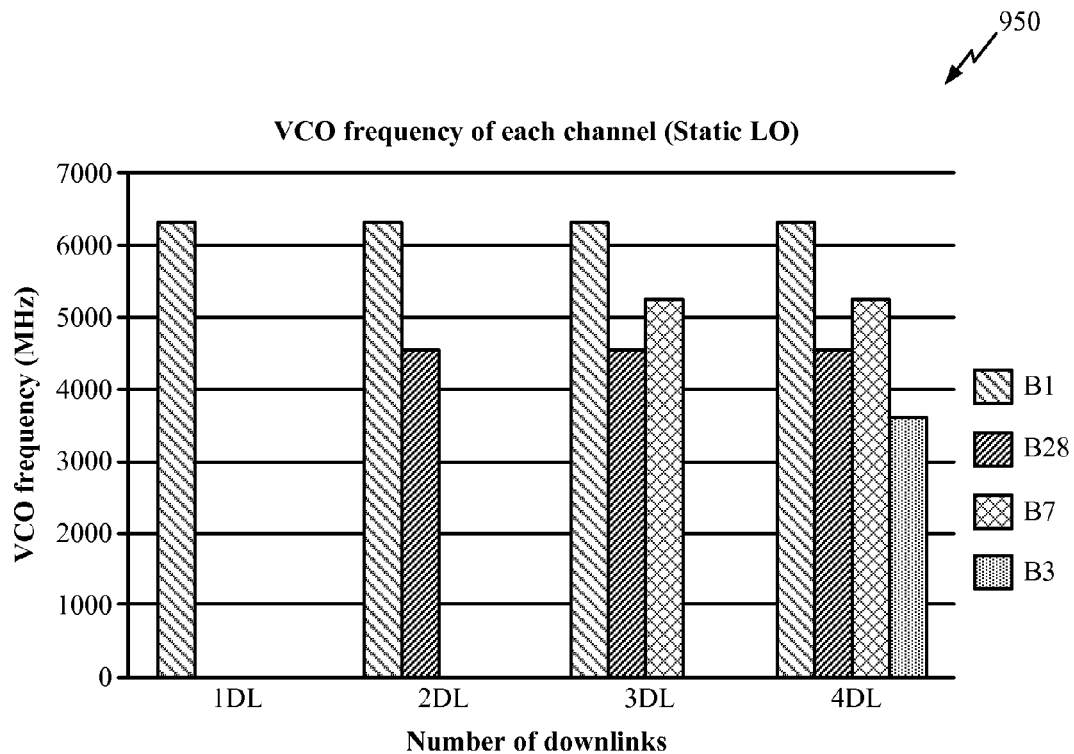
FIG. 9B provides a bar graph and a corresponding table of VCO frequencies for different numbers of downlink CCs for a static LO scheme, in accordance with certain aspects of the present disclosure.

FIG. 9B provides a bar graph 950 and a corresponding table 960 of VCO frequencies for different numbers of downlink CCs for a static LO scheme, in accordance with certain aspects of the present disclosure. For the static LO scheme, the VCO spectra of existing downlink component carriers do not change as carriers are added or removed, in contrast with the bar graph 900 of FIG. 9A.

Figure 10:
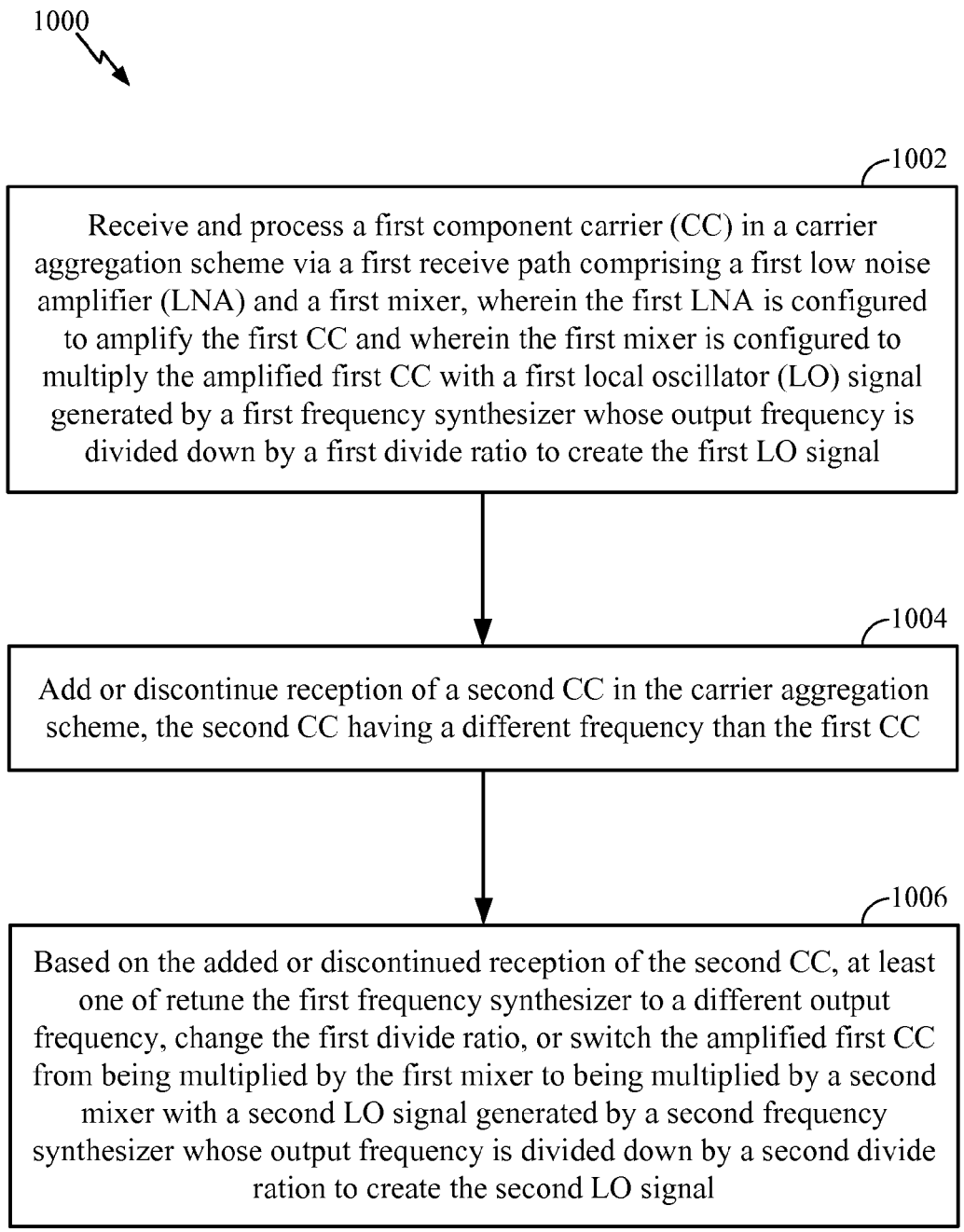
FIG. 10 is a flow diagram of example operations for implementing a dynamic LO scheme and switchable receive paths, in accordance with certain aspects of the present disclosure.

FIG. 10 is a flow diagram of example operations 1000 for implementing a dynamic LO scheme and switchable receive paths, in accordance with certain aspects of the present disclosure. The operations 1000 may be performed by an apparatus for wireless communications, such as a base station or a mobile station.

The operations 1000 may begin, at 1002, by receiving and processing a first CC in a carrier aggregation scheme via a first receive path. The first receive path may include a first LNA and a first mixer. The first LNA is configured to amplify the first CC, and the first mixer is configured to multiply the amplified first CC with a first LO signal received by a first LO path and generated by a first frequency synthesizer whose output frequency is divided down by a first divide ratio to create the first LO signal.

At 1004, reception of a second CC in the carrier aggregation scheme may be added or discontinued. In other words, the number of downlink CCs may be increased or decreased, respectively. While the second CC has a different frequency than the first CC, the second CC may be in the same or a different Evolved UMTS (Universal Mobile Telecommunications System) Terrestrial Radio Access (E-UTRA) frequency band than the first CC.

Based on the added or discontinued reception of the second CC at 1004, at least one of the following operations may occur at 1006: (1) retuning the first frequency synthesizer to a different output frequency; (2) changing the first divide ratio; or (3) switching the amplified first CC from being multiplied by the first mixer to being multiplied by a second mixer with the first LO signal received via a second LO path and generated by a second frequency synthesizer whose output frequency is divided down by a second divide ratio to create the first LO signal.

According to certain aspects, the first frequency synthesizer has the lowest current consumption of all frequency synthesizers for the carrier aggregation scheme when the first CC is the only component carrier.

According to certain aspects, the least one of the retuning, the changing, or the switching is selected based on at least one of: (1) current consumption associated with the first and second divide ratios and with the first and second frequency synthesizers; or (2) coupling between at least one of the first LO signal, the first component carrier, the second component carrier, a first or second harmonic of a transmit signal, or an LO signal associated with the transmit signal.

According to certain aspects, adding reception of the second CC involves receiving and processing the second CC via a second receive path. The second receive path includes a second LNA and a third mixer. The second LNA is configured to amplify the second CC, and the third mixer is configured to multiply the amplified second CC with a second LO signal received via a third LO path and generated by a third frequency synthesizer whose output frequency is divided down by a third divide ratio to create the second LO signal. For certain aspects, the third frequency synthesizer is the same as the first frequency synthesizer.

According to certain aspects, the operations 1000 may further involve adding or discontinuing reception of a third CC in the carrier aggregation scheme. The third CC has a different frequency than the first and second CCs. Based on the added or discontinued reception of the third CC, at least one of the following operations may occur: (1) retuning at least one of the first, second, or third frequency synthesizer to a different output frequency; (2) changing at least one of the first, second, or third divide ratio; (3) switching the amplified first CC from being multiplied by the first mixer to being multiplied by the second mixer; (4) switching the amplified first CC from being multiplied by the second mixer to being multiplied by the first mixer; or (5) switching the amplified first CC from being multiplied by the first or second mixer to being multiplied by a fourth mixer with the first LO signal received via a fourth LO path and generated by a fourth frequency synthesizer whose output frequency is divided down by a fourth divide ratio to create the first LO signal. For certain aspects, adding reception of the third CC includes receiving and processing the third CC via a third receive path comprising a third LNA and a fifth mixer, wherein the third LNA is configured to amplify the third CC, and wherein the fifth mixer is configured to multiply the amplified third CC with a third LO signal received via a fifth LO path and generated by a fifth frequency synthesizer whose output frequency is divided down by a fifth divide ratio to create the third LO signal. The fifth frequency synthesizer may be the same as the first, second, third, or fourth frequency synthesizer (e.g., in a case where there are only 4 CA frequency synthesizers).

According to certain aspects, the operations 1000 may further include adding or discontinuing reception of a fourth CC in the carrier aggregation scheme. The fourth CC has a different frequency than the first, second, and third CCs. Based on the added or discontinued reception of the fourth CC, at least one of the following operations may occur: (1) retuning at least one of the first, second, third, or fourth frequency synthesizer to a different output frequency; (2) changing at least one of the first, second, third, or fourth divide ratio; (3) switching the amplified first CC from being multiplied by the first mixer to being multiplied by the second or fourth mixer; (4) switching the amplified first CC from being multiplied by the second mixer to being multiplied by the first or fourth mixer; (5) switching the amplified first CC from being multiplied by the fourth mixer to being multiplied by the first or second mixer; or (6) switching the amplified first CC from being multiplied by the first, second, or fourth mixer to being multiplied by a sixth mixer with the first LO signal received via a sixth LO path and generated by a sixth frequency synthesizer whose output frequency is divided down by a sixth divide ratio to create the first LO signal. For certain aspects, adding reception of the fourth CC involves receiving and processing the fourth CC via a fourth receive path having a fourth LNA and a seventh mixer. The fourth LNA is configured to amplify the fourth CC, and the seventh mixer is configured to multiply the amplified fourth CC with a fourth LO signal received via a seventh LO path and generated by a seventh frequency synthesizer whose output frequency is divided down by a seventh divide ratio to create the fourth LO signal. The seventh frequency synthesizer may be the same as the second frequency synthesizer, and the seventh mixer may be the same as the second mixer. For certain aspects, the sixth frequency synthesizer is not the first, second, or third frequency synthesizer.

The various operations or methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting may comprise a transmitter (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for receiving may comprise a receiver (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for synthesizing a frequency (or an oscillating signal having a particular frequency) may comprise a frequency synthesizer, such as the RX frequency synthesizer 330 of FIG. 3, which may include a phase-locked loop (PLL) having a VCO. Means for frequency dividing may comprise a frequency divider, such as a frequency divider for generating an LO. Means for receiving and processing may comprise a receive path (i.e., a receive chain), such as the RX path 304 of FIG. 3. Means for amplifying may comprise an amplifier, such as the LNA 322 of FIG. 3 or the LNAs 702, 736, 766, and 796 of FIG. 7D. Means for mixing may comprise a mixer, such as the mixer 324 of FIG. 3 or the mixers 738, 764, 734, and 794 of FIG. 7D.

Means for processing, means for adding or discontinuing reception, means for selecting, or means for determining may comprise a processing system, which may include one or more processors, such as the RX data processor 270, the TX data processor 288, and/or the controller 280 of the user terminal 120 illustrated in FIG. 2. Additionally or alternatively, means for adding or discontinuing reception or means for selecting may comprise an interface between antennas and a receive path, such as the interface 306 of FIG. 3. For example, a processing system (as described in the previous sentence) may control this interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. A method for wireless communications, comprising:
receiving and processing a first component carrier (CC) in a carrier aggregation scheme via a first receive path comprising a first low noise amplifier (LNA) and a first mixer, wherein the first LNA is configured to amplify the first CC and wherein the first mixer is configured to multiply the amplified first CC with a first local oscillator (LO) signal received via a first LO path and generated by a first frequency synthesizer whose output frequency is divided down by a first divide ratio to create the first LO signal;
adding or discontinuing reception of a second CC in the carrier aggregation scheme, the second CC having a different frequency than the first CC; and
based on the added or discontinued reception of the second CC, at least one of:
retuning the first frequency synthesizer to a different output frequency;
changing the first divide ratio; or
switching the amplified first CC from being multiplied by the first mixer to being multiplied by a second mixer with the first LO signal received via a second LO path and generated by a second frequency synthesizer whose output frequency is divided down by a second divide ratio to create the first LO signal.

2. The method of claim 1, wherein the first frequency synthesizer has the lowest current consumption of all frequency synthesizers for the carrier aggregation scheme when the first CC is the only component carrier.

3. The method of claim 1, wherein the least one of the retuning, the changing, or the switching is selected based on at least one of:
current consumption associated with the first and second divide ratios and with the first and second frequency synthesizers; or
coupling between at least one of the first LO signal, the first component carrier, the second component carrier, a first or second harmonic of a transmit signal, or an LO signal associated with the transmit signal.

4. The method of claim 1, wherein adding reception of the second CC comprises receiving and processing the second CC via a second receive path comprising a second LNA and a third mixer, wherein the second LNA is configured to amplify the second CC, and wherein the third mixer is configured to multiply the amplified second CC with a second LO signal received via a third LO path and generated by a third frequency synthesizer whose output frequency is divided down by a third divide ratio to create the second LO signal.

5. The method of claim 4, wherein the third frequency synthesizer is the first frequency synthesizer.

6. The method of claim 4, further comprising:
adding or discontinuing reception of a third CC in the carrier aggregation scheme, the third CC having a different frequency than the first and second CCs; and
based on the added or discontinued reception of the third CC, at least one of:
retuning at least one of the first, second, or third frequency synthesizer to a different output frequency;
changing at least one of the first, second, or third divide ratio;
switching the amplified first CC from being multiplied by the first mixer to being multiplied by the second mixer;
switching the amplified first CC from being multiplied by the second mixer to being multiplied by the first mixer; or
switching the amplified first CC from being multiplied by the first or second mixer to being multiplied by a fourth mixer with the first LO signal received via a fourth LO path and generated by a fourth frequency synthesizer whose output frequency is divided down by a fourth divide ratio to create the first LO signal.

7. The method of claim 6, wherein adding reception of the third CC comprises receiving and processing the third CC via a third receive path comprising a third LNA and a fifth mixer, wherein the third LNA is configured to amplify the third CC, and wherein the fifth mixer is configured to multiply the amplified third CC with a third LO signal received via a fifth LO path and generated by a fifth frequency synthesizer whose output frequency is divided down by a fifth divide ratio to create the third LO signal.

8. The method of claim 7, wherein the fifth frequency synthesizer is the first, second, third, or fourth frequency synthesizer.

9. The method of claim 7, further comprising:
adding or discontinuing reception of a fourth CC in the carrier aggregation scheme, the fourth CC having a different frequency than the first, second, and third CCs; and
based on the added or discontinued reception of the fourth CC, at least one of:
retuning at least one of the first, second, third, or fourth frequency synthesizer to a different output frequency;
changing at least one of the first, second, third, or fourth divide ratio;
switching the amplified first CC from being multiplied by the first mixer to being multiplied by the second or fourth mixer;
switching the amplified first CC from being multiplied by the second mixer to being multiplied by the first or fourth mixer;
switching the amplified first CC from being multiplied by the fourth mixer to being multiplied by the first or second mixer; or
switching the amplified first CC from being multiplied by the first, second, or fourth mixer to being multiplied by a sixth mixer with the first LO signal received via a sixth LO path and generated by a sixth frequency synthesizer whose output frequency is divided down by a sixth divide ratio to create the first LO signal.

10. The method of claim 9, wherein adding reception of the fourth CC comprises receiving and processing the fourth CC via a fourth receive path comprising a fourth LNA and a seventh mixer, wherein the fourth LNA is configured to amplify the fourth CC, and wherein the seventh mixer is configured to multiply the amplified fourth CC with a fourth LO signal received via a seventh LO path and generated by a seventh frequency synthesizer whose output frequency is divided down by a seventh divide ratio to create the fourth LO signal.

11. The method of claim 10, wherein the seventh frequency synthesizer is the second frequency synthesizer and wherein the seventh mixer is the second mixer.

12. The method of claim 9, wherein the sixth frequency synthesizer is not the first, second, or third frequency synthesizer.

13. The method of claim 1, wherein the second CC is in a different Evolved UMTS (Universal Mobile Telecommunications System) Terrestrial Radio Access (E-UTRA) frequency band than the first CC.

14. An apparatus for wireless communications, comprising:
a first frequency synthesizer whose output frequency is divided down by a first divide ratio to create a first local oscillator (LO) signal;
a first receive path configured to receive and process a first component carrier (CC) in a carrier aggregation scheme, the first receive path comprising:
a first low noise amplifier (LNA) configured to amplify the first CC; and
a first mixer configured to multiply the amplified first CC with the first LO signal received via a first LO path; and
a processing system configured to:
add or discontinue reception of a second CC in the carrier aggregation scheme, the second CC having a different frequency than the first CC; and
based on the added or discontinued reception of the second CC, at least one of:
retune the first frequency synthesizer to a different output frequency;
change the first divide ratio; or
switch the amplified first CC from being multiplied by the first mixer to being multiplied by a second mixer with the first LO signal received via a second LO path and generated by a second frequency synthesizer whose output frequency is divided down by a second divide ratio to create the first LO signal.

15. The apparatus of claim 14, wherein the first frequency synthesizer has the lowest current consumption of all frequency synthesizers for the carrier aggregation scheme when the first CC is the only component carrier.

16. The apparatus of claim 14, wherein the processing system is configured to select the least one of the retuning, the changing, or the switching based on at least one of:
current consumption associated with the first and second divide ratios and with the first and second frequency synthesizers; or
coupling between at least one of the first LO signal, the first component carrier, the second component carrier, a first or second harmonic of a transmit signal, or an LO signal associated with the transmit signal.

17. The apparatus of claim 14, further comprising:
a second receive path comprising a second LNA and a third mixer; and
a third frequency synthesizer, wherein the processing system is configured to add reception of the second CC by controlling receiving and processing of the second CC via the second receive path, wherein the second LNA is configured to amplify the second CC, and wherein the third mixer is configured to multiply the amplified second CC with a second LO signal received via a third LO path and generated by the third frequency synthesizer whose output frequency is divided down by a third divide ratio to create the second LO signal.

18. The apparatus of claim 17, wherein the third frequency synthesizer is the first frequency synthesizer.

19. The apparatus of claim 17, wherein the processing system is configured to:
add or discontinue reception of a third CC in the carrier aggregation scheme, the third CC having a different frequency than the first and second CCs; and
based on the added or discontinued reception of the third CC, at least one of:
retune at least one of the first, second, or third frequency synthesizer to a different output frequency;
change at least one of the first, second, or third divide ratio;
switch the amplified first CC from being multiplied by the first mixer to being multiplied by the second mixer;
switch the amplified first CC from being multiplied by the second mixer to being multiplied by the first mixer; or
switch the amplified first CC from being multiplied by the first or second mixer to being multiplied by a fourth mixer with the first LO signal received via a fourth LO path and generated by a fourth frequency synthesizer whose output frequency is divided down by a fourth divide ratio to create the first LO signal.

20. The apparatus of claim 19, further comprising:
a third receive path comprising a third LNA and a fifth mixer; and
a fifth frequency synthesizer, wherein the processing system is configured to add reception of the third CC by controlling receiving and processing of the third CC via the third receive path, wherein the third LNA is configured to amplify the third CC, and wherein the fifth mixer is configured to multiply the amplified third CC with a third LO signal received via a fifth LO path and generated by the fifth frequency synthesizer whose output frequency is divided down by a fifth divide ratio to create the third LO signal.

21. The apparatus of claim 20, wherein the fifth frequency synthesizer is the first, second, third, or fourth frequency synthesizer.

22. The apparatus of claim 20, wherein the processing system is configured to:
add or discontinue reception of a fourth CC in the carrier aggregation scheme, the fourth CC having a different frequency than the first, second, and third CCs; and
based on the added or discontinued reception of the fourth CC, at least one of:
retune at least one of the first, second, third, or fourth frequency synthesizer to a different output frequency;
change at least one of the first, second, third, or fourth divide ratio;
switch the amplified first CC from being multiplied by the first mixer to being multiplied by the second or fourth mixer;
switch the amplified first CC from being multiplied by the second mixer to being multiplied by the first or fourth mixer;
switch the amplified first CC from being multiplied by the fourth mixer to being multiplied by the first or second mixer; or
switch the amplified first CC from being multiplied by the first, second, or fourth mixer to being multiplied by a sixth mixer with the first LO signal received via a sixth LO path and generated by a sixth frequency synthesizer whose output frequency is divided down by a sixth divide ratio to create the first LO signal.

23. The apparatus of claim 22, further comprising:
a fourth receive path comprising a fourth LNA and a seventh mixer; and
a seventh frequency synthesizer, wherein the processing system is configured to add reception of the fourth CC by controlling receiving and processing of the fourth CC via the fourth receive path, wherein the fourth LNA is configured to amplify the fourth CC, and wherein the seventh mixer is configured to multiply the amplified fourth CC with a fourth LO signal received via a seventh LO path and generated by the seventh frequency synthesizer whose output frequency is divided down by a seventh divide ratio to create the fourth LO signal.

24. The apparatus of claim 23, wherein the seventh frequency synthesizer is the second frequency synthesizer and wherein the seventh mixer is the second mixer.

25. The apparatus of claim 22, wherein the sixth frequency synthesizer is not the first, second, or third frequency synthesizer.

26. The apparatus of claim 14, wherein the second CC is in a different Evolved UMTS (Universal Mobile Telecommunications System) Terrestrial Radio Access (E-UTRA) frequency band than the first CC.

27. A non-transitory computer-readable medium for wireless communications, the medium having instructions stored thereon, which are executable to:
receive and process a first component carrier (CC) in a carrier aggregation scheme via a first receive path comprising a first low noise amplifier (LNA) and a first mixer, wherein the first LNA is configured to amplify the first CC and wherein the first mixer is configured to multiply the amplified first CC with a first local oscillator (LO) signal received via a first LO path and generated by a first frequency synthesizer whose output frequency is divided down by a first divide ratio to create the first LO signal;
add or discontinue reception of a second CC in the carrier aggregation scheme, the second CC having a different frequency than the first CC; and
based on the added or discontinued reception of the second CC, at least one of:
retune the first frequency synthesizer to a different output frequency;
change the first divide ratio; or
switch the amplified first CC from being multiplied by the first mixer to being multiplied by a second mixer with the first LO signal received via a second LO path and generated by a second frequency synthesizer whose output frequency is divided down by a second divide ratio to create the first LO signal.

28. An apparatus for wireless communications, comprising:
means for synthesizing a first frequency;
means for frequency dividing the first frequency by a first divide ratio to create a first local oscillator (LO) signal;
means for receiving and processing a first component carrier (CC) in a carrier aggregation scheme, comprising:
means for amplifying the first CC; and
first means for mixing the amplified first CC with the first LO signal received via a first LO path;
means for adding or discontinuing reception of a second CC in the carrier aggregation scheme, the second CC having a different frequency than the first CC; and
means for selecting, based on the added or discontinued reception of the second CC, between at least one of:
retuning the means for synthesizing the first frequency to a different output frequency;
changing the first divide ratio; or
switching the amplified first CC from being mixed by the first means for mixing to being mixed by a second means for mixing with the first LO signal received via a second LO path and generated by means for synthesizing a second frequency that is divided down by a second divide ratio to create the first LO signal.

\* \* \* \* \*